United States Patent [19]

Donaldson

[11] 4,389,781
[45] Jun. 28, 1983

[54] PNEUMATIC COUNTERBALANCE FOR A COORDINATE MEASURING MACHINE

[75] Inventor: Robert D. Donaldson, West Carrollton, Ohio

[73] Assignee: The Bendix Corporation, Southfield, Mich.

[21] Appl. No.: 291,526

[22] Filed: Aug. 10, 1981

[51] Int. Cl.³ .............................................. G01B 5/20
[52] U.S. Cl. .................................. 33/1 M; 33/169 R; 33/DIG. 2; 33/174 L
[58] Field of Search ................ 33/174 L, 1 M, 174 P, 33/147 N, 169 R, DIG. 2

[56] References Cited

U.S. PATENT DOCUMENTS

| | | | |
|---|---|---|---|
| 3,818,596 | 6/1974 | Stemple et al. | 33/1 M |
| 3,840,993 | 10/1974 | Shelton | 33/1 M |
| 4,155,173 | 5/1979 | Sprandel | 33/1 M |

Primary Examiner—Willis Little
Attorney, Agent, or Firm—Howard G. Massung

[57] ABSTRACT

A coordinate measuring machine (10) having a vertically movable probe (41), the weight of which is offset by an improved pneumatic counterbalance (50). The pneumatic counterbalance system (50) is adapted to use a source of pressurized air (72) acting upon a ball piston (54) which is directly connected to a probe arm (42) which supports the probe (41). An accumulator (60) having a capacity large enough to insure only a small change in the counterbalanced force as the ball piston (54) moves within its cylinder (52) is provided. A valve (70) is provided in the connection of the air supply (72) to the accumulator (60). The valve (70) is adjusted to provide make up air for the air which leaks past the ball piston (54). Preferably, the accumulator (60) is formed as a pressurized plenum (60) which surrounds the cylinder (52).

15 Claims, 2 Drawing Figures

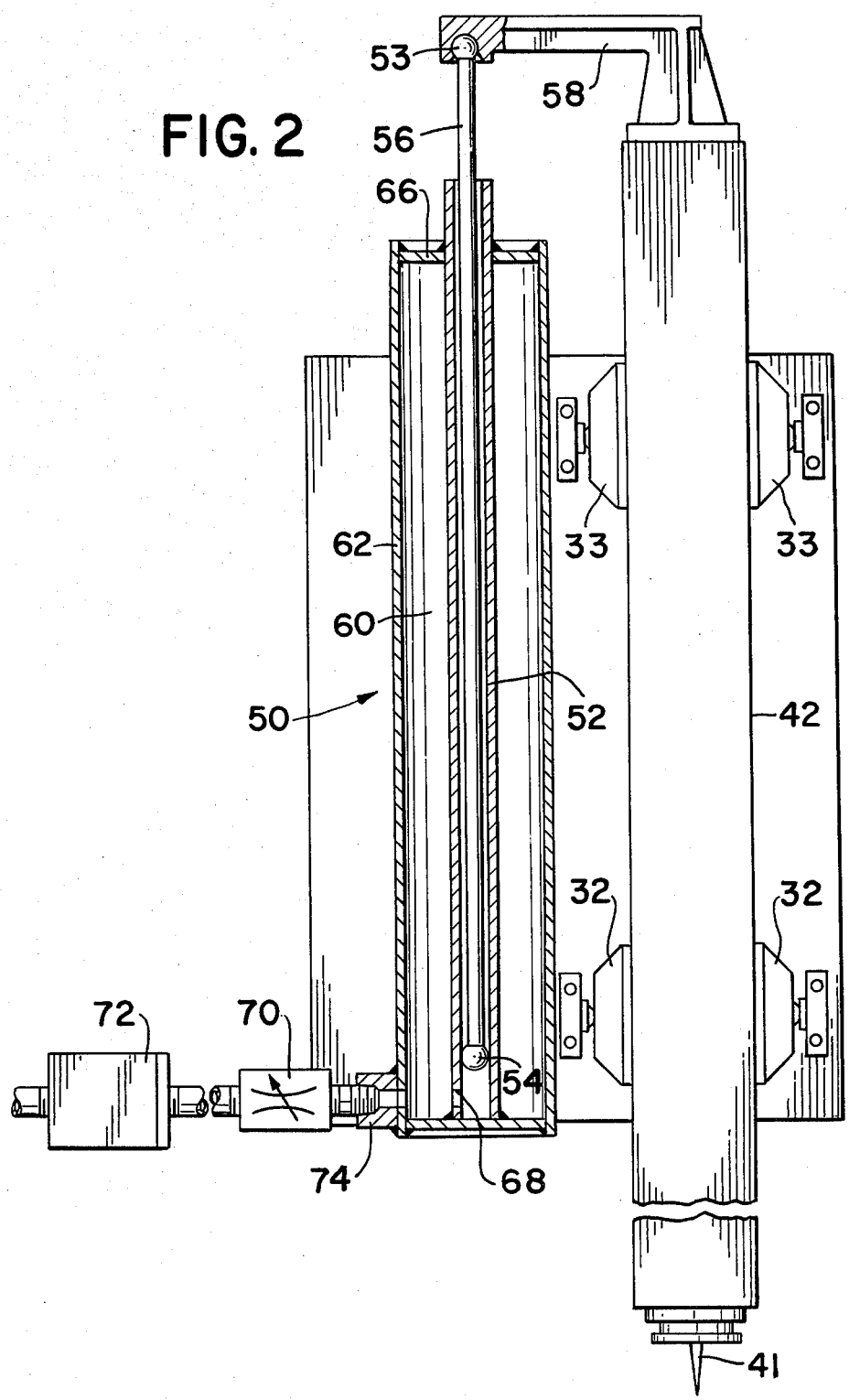

PNEUMATIC COUNTERBALANCE FOR A COORDINATE MEASURING MACHINE

BACKGROUND OF THE INVENTION

Technical Field

This invention relates to coordinate measuring machines and more particularly to an improved and simplified pneumatic counterbalance system for offsetting the weight of the vertically movable probe assembly used on a coordinate measuring machine.

Background Art

Coordinate measuring machines are well-known in the prior art. In a common type of coordinate measuring machine, which is used to make measurements of an article, a probe is mounted at the end of a vertically movable probe arm. The vertically movable prove arm is typically supported by a carriage which is horizontally movable. Movement of the probe arm or carriage is accomplished in a manual type machine by an operator grasping the probe and physically moving it to the desired position, or, in a more sophisticated machine, by a motor and controller automatically positioning the probe.

In order to measure the article, the probe and carriage must be easily movable. Ideally, the probe and carriage and the related apparatus should be lightweight. The vertically movable probe arm should be easily movable in response to desired positioning by an operator. However, the probe and associated probe arm must not be movable freely or when no movement is desired as otherwise the weight of the vertically movable probe assembly could bring it down and present a safety hazard. It is also necessary that a coordinate measuring machine must be very accurate. Such accuracy is dependent upon low friction which in turn is related to the weight of the movable apparatus which is supported from the base of the coordinate measuring machine.

Several systems have been suggested to counterbalance the weight of the probe shaft assembly to prevent it falling downward and thereby possibly causing injury or damage. Prior art counterbalancing systems include mechanical counterbalances, pneumatic counterbalances, and electrical counterbalances.

One method of accomplishing mechanical counterbalancing is to provide the probe shaft with an equivalent weight mounted to and offsetting the weight of the probe assembly. A disadvantage of such an arrangement is that the equivalent mechanical weights add significantly to the friction and inertia in the system and make it more difficult to move the probe and the carriage to accomplish the measurements on the article.

Another mechanical counterbalance approach used in the prior art couples the probe to a spring to provide an equivalent force directed opposit to the weight of the probe assembly. Unfortuantely, springs are not available which exert a uniform force over a typical operating range of probe shaft movement, which is normally between 8 and 40 inches depending on the size of the machine. Further, the use of a spring counterbalance could result in friction which is greater than desired in some applications.

An electric counterbalance is disclosed in U.S. Pat. No. 3,818,596. In this patent, a counterbalance arrangement is disclosed which uses a variable torque magnetic particle clutch which has an output which is varied in accordance with the weight of the probe shaft.

Prior art counterbalances have typically had more friction than desired which makes it difficult to move the probe shaft. Further, most prior art systems have characteristically been large and heavy, which have an unsatisfactory effect on the accuracy and repeatability of the coordinate measuring machine.

U.S. Pat. No. 4,207,680 which is herein incorporated by reference, discloses a pneumatic counterbalance system which has been found to operate satisfactorily. However, this system requires a precision air pressure regulator with large flow capacity.

DISCLOSURE OF THE INVENTION

The present invention teaches a coordinate measuring machine having a relatively simple pneumatic counterbalance system for counterbalancing the weight of the vertically movable probe arm assembly. The disclosed counterbalance system permits good accuracy and repeatability of measurements.

The disclosed counterbalance is a pneumatic spring formed from a piston and cylinder arrangement connected for free communication with a relatively large pressurized air accumulator. A ball or spherical piston is connected directly to the vertical probe arm for movement therewith. The piston is connected to a rod which is connected by a ball in a spherical seat to a rigid bracket attached directly to the vertical probe arm. This ball joint connection allows the cylinder to be out of alignment with the probe arm and not bind or bend the probe arm during movement. Preferably the piston is spherical, however, a cylindrical piston could be used so long as its connection to the rod allows for swivel.

Preferably, the relatively large accumulator is formed as a plenum which surrounds the cylinder. The volume of the accumulator is substantially larger than the volume of the cylinder so that only a relatively small force change is encountered as the probe arm is moved up or down. Air can move freely from the cylinder to the accumulator thus eliminating the bouncy feeling of air springs when a cylinder is directly supplied by a pressure regulator. Air which leaks past the piston is made up from a regulated air supply which feeds the accumulator through a variable flow control valve, or a small, low accuracy, low flow capacity regulator. This relatively inexpensive make up valve, such as a needle valve, is adjusted to balance for leakage past the piston at a set pressure.

The vertically movable probe arm is supported by low friction bearings such as air bearings to permit easy movement.

BRIEF DESCRIPTION OF THE DRAWINGS

For a better understanding of the invention, reference may be had to the preferred embodiment exemplary thereof shown in the accompanying drawings wherein.

BEST MODE FOR CARRYING OUT THE INVENTION

Figure 1:
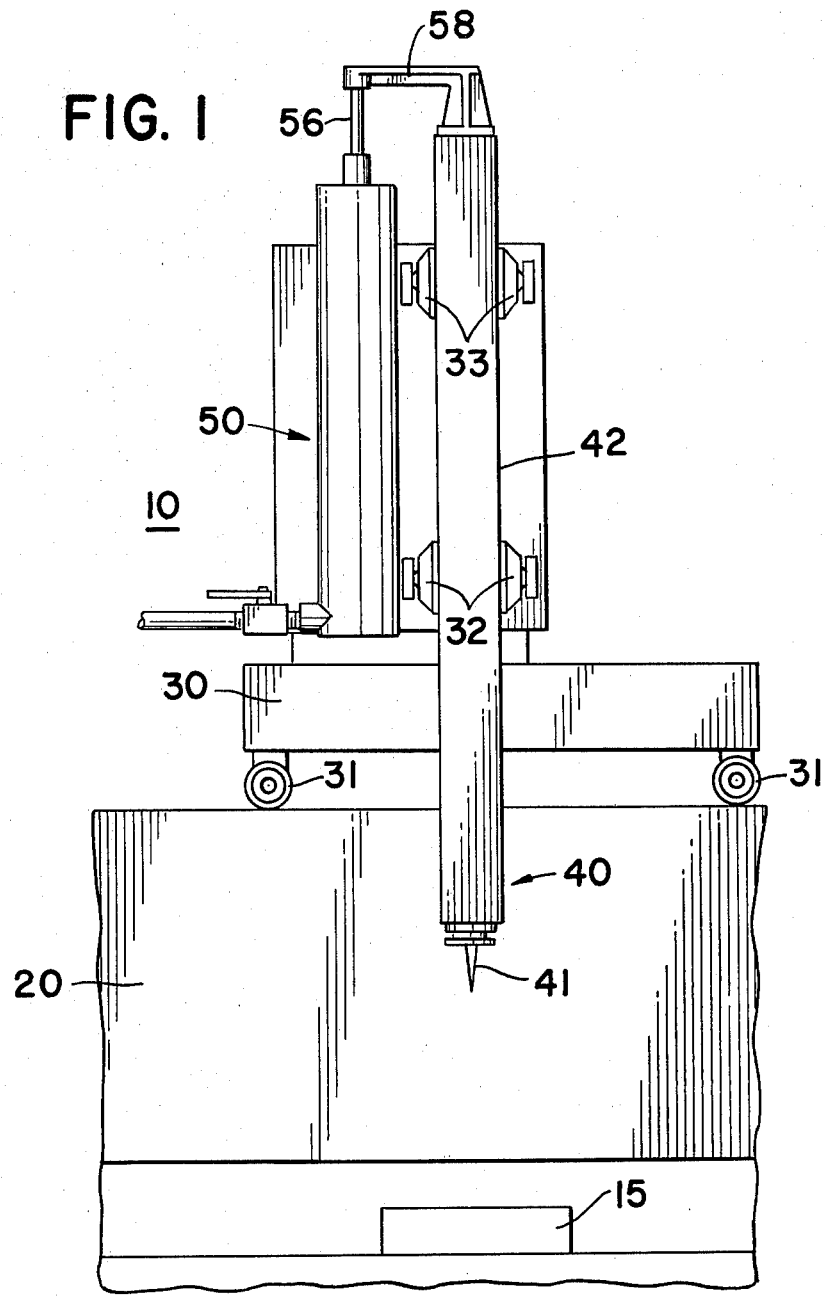
FIG. 1 is a view of a coordinate measuring machine constructed according to the teaching of the present invention; and, FIG. 2 is an enlarged section view showing the pneumatic counterbalance in more detail.

Referring now to the drawings, there is shown a coordinate measuring machine 10 using a pneumatic counterbalancing system 50 according to the present invention. Coordinate measuring machine 10 includes a base position 20 and a horizontally movable carriage 30. Carriage 30 is mounted by bearings 31 to base 20. A vertically mounted probe assembly 40 is movably mounted to carriage 30 by a lower set of air bearings 32 and an upper set of air bearings 33. The probe assembly 40 includes a probe tip 41 which engages an article 15 to be measured. Probe tip 41 is mounted on the end of a vertically movable probe arm 42.

The probe assembly 40 is adapted to be moved vertically either by an operator or an automatic control to inspect various portions of article 15. Probe tip 41 is instrumented in a manner well known in the art to provide an output indicative of the position of portions of article 15 at various points in time. The output can either be a display or other suitable record, which are not shown but both of which are well known in the art and form no basis of the instant invention.

FIG. 2 illustrates in detail the pneumatic counterbalance system 50. A cylinder 52 has a spherical ball piston 54 disposed therein. A rod 56, fixed to ball piston 54, extends from the open end of cylinder 52 and is connected by a ball joint 53 to a rigid bracket 58. Connecting the ball piston 54 and rod 56 to rigid bracket 58 through ball joint 53 allows the rod 56 to be out of alignment with probe arm 42 and not bind or bend the probe arm during movement. This feature is important since binding or bending would reduce the accuracy of movement of the probe arm 42. Ball piston 54, rod 56, bracket 58, and probe arm 42 are movable together as a unit. Use of a ball piston 54 is particularly advantageous since it can easily be placed in cylinder 52 and exact vertical alignment of rod 56 is not required. However, a cylindrical piston could also be used if the connection of the cylindrical piston to rod 56 allowed for swivel.

Pressurized air is supplied to cylinder 52 to counterbalance the weight of the probe assembly 40 so that its apparent weight is light. A plenum or accumulator 60, formed by cylindrical members 62 and end caps 64 and 66, is disposed around cylindrical 52. Accumulator 60 can communicate freely thorugh passage 68 with cylinder 52. Cylinder 52 is disposed inside of pressurized accumulator plenum 60. Air can move freely from the bottom of cylinder 52 to the plenum 60 thus eliminating the bouncy feel of air springs with a cylinder supplied directly by a pressure regulator.

Air from the pressurized plenum 60 continually leaks past ball piston 54 and is vented to atmosphere. The air which leaks past piston 54 is made up by a needle valve 70, which is a much simpler and cheaper device than a high accuracy, large flow capacity pressure regulator. Needle valve 70 is disposed between a regulated air pressure supply 72 and an inlet 74 to plenum 60. The pressure in plenum 60 is adjusted using needle valve 70 to provide the makeup air to counterbalance most of the weight of probe assembly 40. In place of needle valve 70 a small, low accuracy, low flow capacity regulator could be used to supply makeup air. The air flow through the variable flow control valve 70 is just sufficient to make up the air which leaks around piston 54.

When probe arm 42 is moved piston 54 also moves changing the volume of pressurized air within cylinder 52 thus changing the pressure. The volume of the plenum 60 and cylinder 52 are constructed so the difference in counterbalance force caused by this change in pressure is within acceptable limits.

For an accumulator having a 51 mm (two-inch) inner diameter and a cylinder 52 having a 9.5 mm (0.375 inch) inner diameter, the volumetric difference between cylinder 52 and accumulator 62 for a 305 mm (twelve inch) stroke is 21.3 cc (1.3 cubic inches) to 612 cc (39.0 cubic inches) or approximately a thirty to one ratio. If the probe assembly weight is approximately 1.8 kg (four pounds), and the probe travels 305 mm (twelve inches), the required plenum pressure to balance the probe assembly is 250 KPa (36.2 psi). If the probe is moved rapidly from bottom to top, the change in pressure is:

$$P_1 V_1^k = P_2 V_2^k$$

$$P_2 = P_1 \left(\frac{V_1}{V_2}\right)^k = (250)\left(\frac{612}{612 + 21.3}\right)^{1.4}$$

$$P_2 = 237 \text{ Kpa} \quad 34.4 \text{ psi}$$

This change in pressure which is 12 KPa (1.71 psi) results in a change in counterbalance force of approximately 85 g (3 ounces). Thus, the probe will feel 85 g (3 ounces) heavier if it is rapidly moved to its top position. This heavier feeling will slowly disappear as the needle valve brings the pressure up to its original value. If allowed to stabilize at the top and then lowered suddenly to the bottom, the probe will feel approximately 85 g lighter at the bottom. Thus, the original down force would have to be greater than 85 g for proper functioning.

The full 305 mm rapid stroking of the counterbalance piston either up or down would result in the maximum momentary pressure change of 4.2% acting on the piston which translates into a 91 g short duration change in the counterbalanced force for a 1.9 kg probe shaft weight. This difference in perceived probe shaft weight is acceptable for operation of the disclosed coordinate measuring machine.

I claim:

1. In a coordinate measuring machine (10), including a base (20), a carriage (30) for movement relative thereto, a probe arm (42) and a probe (41) disposed at the free end of said probe arm (42) for engaging an article to be measured, characterized by:
   a pressurized pneumatic accumulator (60);
   a cylinder (52) having one end in free communication with said pneumatic accumulator (60) and the other end vented to atmosphere:
   a piston (54) disposed within said cylinder (52) for relative movement therein and permitting pressurized air to leak around;
   connecting means (56,58) connecting said piston (54) to said probe arm (54) for movement together;
   a regulated air supply (72); and,
   variable flow control valve (10) connecting said regulated air supply (72) to said accumulator (60) and being adjusted to balance for leakage past said piston (54) at a selected pressure.

2. In a coordinate measuring machine (10) as claimed in claim 1 said connecting means (56,58) is characterized by:
   a rod (56) connected to said piston (54);
   a rigid bracket (58) secured to said probe arm (42); and,
   swivel connecting means (53) for connecting said rod (56) to said rigid bracket (58).

3. In a coordinate measuring amchine (10) as claimed in claim 1 wherein:
   said piston (54) has a spherical shape.

4. A coordinate measuring machine (10) as claimed in claim 1 wherein:
said accumulator (60) comprises a second cylindrical member (62) disposed around said first cylinder (52); and,
the ratio of the volume of said accumulator to said first cylinder is greater than twenty to one.

5. A coordinate measuring machine as claimed in claim 1 wherein:
said probe arm (42) is supported by air bearing guides for low friction movement.

6. A coordinate measuring machine for measuring an article comprising:
a base;
a carriage mounted on said base for relative movement therealong;
a probe for engaging the article to be measured;
a mounting means disposed on said carriage for supporting said probe for vertical movement with respect to said carriage comprising;
a probe arm having the probe connected to one end thereof,
a cylinder mounted on said carriage,
a piston disposed in said cylinder for relative movement,
connecting means for connecting said pistons to said probe arm for movement therewith,
a pneumatic accumulator connected to one end of said cylinder to maintain the pressure within said cylinder within a predetermined range as said piston moves in said cylinder, and
a source of pressurized air connected to said pneumatic accumulator.

7. A coordinate measuring machine as claimed in claim 6 wherein said connecting means comprises:
a rigid bracket secured to said probe arm; and
a rod disposed between said piston and said rigid bracket and connected by a swivel joint to said rigid bracket.

8. A coordinate measuring machine as claimed in claim 6 comprising:
a variable flow control valve disposed in the connection of said air supply to said accumulator and adjusted to balance for leakage past said piston.

9. A coordinate measuring machine as claimed in claim 6 wherein:
said accumulator comprises a second cylinder disposed around said first cylinder.

10. A coordinate measuring machine as claimed in claim 6 wherein:
the volume of said accumulator is at least thirty times greater than the volume of said first cylinder.

11. A measuring machine as claimed in claim 10 wherein:
said cylinder is at least partially disposed within said pneumatic accumulator; and
connecting means for connecting said piston to said probe arm.

12. A measuring machine as claimed in claim 11 wherein said connecting means comprises:
a rod secured to piston;
a rigid bracket secured to said probe arm;
swivel connecting means for swivel connecting said rod to said rigid bracket.

13. A measuring machine as claimed in claim 10 wherein said piston has a spherical shape.

14. A coordinate measuring machine as claimed in claim 6 comprising:
air bearing guides supporting said probe arm for low friction movement.

15. A machine for measuring an article comprising:
a base;
a carriage disposed on said base for relative movement thereto;
a probe arm supported on said carriage for movement relative thereto;
a pneumatic counterbalance disposed on said carriage and connected to said probe arm comprising,
a cylinder,
a piston disposed in said cylinder for movement relative thereto,
a pneumatic accumulator connected in free communication to one end of said cylinder to maintain the pneumatic pressure on said piston within a selected range as said piston moves in said cylinder,
a source of pressurized air connected to said pneumatic accumulator, and
a variable flow control valve through which said source of pressurized air is connected to said accumulator and adjusted to balance for leakage past said piston.

* * * * *